United States Patent [19]
Fischer

[11] Patent Number: 5,882,032
[45] Date of Patent: Mar. 16, 1999

[54] ATTACHMENT DEVICE FOR SECURING A GAS BAG MODULE TO A VEHICLE PART

[75] Inventor: Anton Fischer, Heuchlingen, Germany

[73] Assignee: TRW Occupant Restraint Systems GmbH, Alfdorf, Germany

[21] Appl. No.: 927,765

[22] Filed: Sep. 11, 1997

[30] Foreign Application Priority Data

Sep. 27, 1996 [DE] Germany ................. 296 16 892 U

[51] Int. Cl.⁶ ................................................ B60R 21/16
[52] U.S. Cl. ........................................ 280/728.2; 280/731
[58] Field of Search .............................. 280/728.2, 731, 280/728.1, 732; 403/338

[56] References Cited

U.S. PATENT DOCUMENTS

| | | | |
|---|---|---|---|
| 5,207,450 | 5/1993 | Pack, Jr. et al. | 280/731 |
| 5,228,362 | 7/1993 | Chen et al. | 280/731 |
| 5,356,173 | 10/1994 | Hongou et al. | 280/731 |
| 5,456,487 | 10/1995 | Daris et al. | 280/732 |

*Primary Examiner*—Eric D. Culbreth
*Attorney, Agent, or Firm*—Tarolli, Sundheim, Covell, Tummino & Szabo

[57] ABSTRACT

An attachment device for securing a gas bag module to a vehicle part is provided. The gas bag module has a housing with at least one receiving opening in the housing. The attached device includes at least one nut which is received in the receiving opening. The nut is fixed to the housing so as to be non-rotatable but substantially linearly displaceable with respect to the housing so that a guide for the housing is formed. The gas bag module further includes at least one bolt screwed into the nut for attaching the gas bag module to the vehicle part. The bolt, in cooperation with the nut and the opening, serves for connecting the gas bag module to the vehicle part.

14 Claims, 1 Drawing Sheet ure 5,882,032

ATTACHMENT DEVICE FOR SECURING A GAS BAG MODULE TO A VEHICLE PART

The invention relates to a means for securing a gas bag module to a vehicle part.

BACKGROUND OF THE INVENTION

Typically, gas bag modules are secured to the hub of a steering wheel. The gas bag module comprises a housing having at least one nut secured thereto, into which a bolt is screwed for arresting the gas bag module to the vehicle part. Hitherto, such gas bag modules have been bolted to the front side or rear side of a steering wheel. For this purpose, nuts are mounted non-rotatably to the housing of the gas bag module, into which the corresponding bolts are then screwed in during assembly, these nuts usually being mounted non-rotatably by means of a press-fit. If the gas bag module is required to be received movably, an intermediate plate is provided, which is resiliently mounted between the gas bag module and the steering wheel. This intermediate plate is secured to the steering wheel skeleton in a longitudinally moveable manner, and the gas bag module is fixedly bolted to the intermediate plate. This way of securing is relatively complicated and requires considerable assembly time.

BRIEF DESCRIPTION OF THE INVENTION

The invention provides a means for securing a gas bag module to a vehicle part, which makes the complicated fitting of an intermediate plate unnecessary, as a result of which the gas bag module can be fitted quickly to the vehicle part. According to the invention, an attachment device for securing a gas bag module to a vehicle part is provided, wherein the gas bag module has a housing with at least one receiving opening in said housing. The device according to the invention comprises at least one nut which is received in the receiving opening. The nut is fixed to the housing so as to be non-rotatable but substantially linearly displaceable with respect to the housing so that a guide for the housing is formed. The gas bag module further comprises at least one bolt screwed into the nut for attaching the gas bag module to the vehicle part. The bolt, in cooperation with the said nut and the opening, serves for connecting the gas bag module to the vehicle part. Instead of the intermediate plate provided hitherto, the nut provided in any case serves as the guide element for the gas bag module, so that the intermediate plate can be eliminated and fewer parts need to be fitted. For this reason, the nut according in the means in accordance with the invention has a dual function. Due to the lower number of parts, the maximum variation in the dimensions of the gas bag module is also less.

The receiving opening may be configured as a guide groove or guide slot. A spring element on the gas bag module urges the latter into its initial position so that the gas bag module is mounted elastically yielding. In the preferred embodiment, which excels by providing good accessibility to the bolt during mounting of the gas bag module, the housing features at least one lateral tab having a laterally protruding section and a downwardly angled end section adjoining the latter and extending parallel to the direction of displacement of the gas bag module, this end section being provided with the receiving opening.

An insertion opening in the protruding section extends into the receiving opening and permits insertion of the nut into the latter, as a result of which the nut can be fitted to the housing very simply and quickly and may form a pre-assembled unit with the latter and the bolt previously screwed into it. This unit which is usually furnished by a supplier can be bolted to the vehicle part on vehicle assembly without the need to provide additional fastener means, since the nut and bolt can already be pre-assembled.

BRIEF DESCRIPTION OF THE DRAWING

Further features and advantages of the invention will be appreciated from the following description of a preferred embodiment and from the drawing to which reference is made. In the drawing, the only figure shows a perspective view of a gas bag module and a steering wheel hub which can be connected to each other displaceably by the means in accordance with the invention.

BRIEF DESCRIPTION OF THE PREFERRED EMBODIMENT

Figure 1:
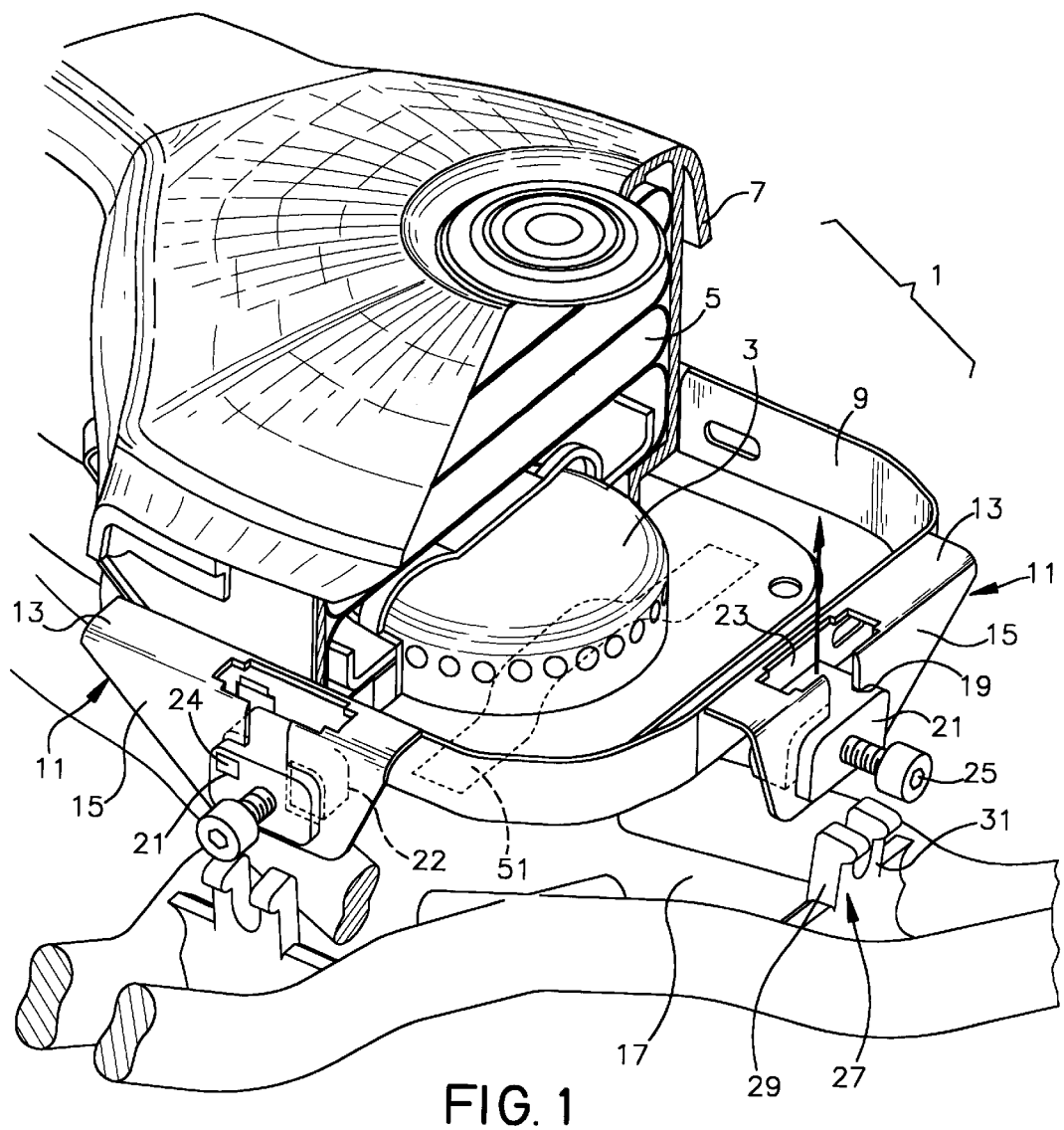

In the figure, a gas bag module 1 is depicted which includes a gas generator 3 and a gas bag 5. The gas bag module 1 is surrounded by a cover 7 and further includes a tray-shaped housing 9 of sheet metal. From a side of the outer edge of the housing 9, several tabs 11 protrude, of which only two are shown, these tabs 11 being integrally connected to the housing 9. Each tab 11 comprises a laterally protruding section 13 and a downwardly angled end section 15 adjoining the latter.

The gas bag module 1 is mounted displaceably on a steering wheel hub 17 with a securing means according to the invention. The securing means is intended to enable the gas bag module 1 to yield to actuation of the horn switch integrated in the cover 7. The means includes a nut 21, configured as a grooved block, displaceably guided in a receiving opening 19 in the form of a receiving slot in the end section 15 and surrounded by an electrically insulating material 24 which completely surrounds the nut. The insulating material 24 is, however, only partly shown in FIG. 1. The nut 21 comprises a groove 22 (Schematically shown) in each of s opposite sides into which the edge of receiving opening 19 extends. Thus, the nut 21 is mounted linearly displaceable and non-rotatably in the receiving opening 19.

For facilitated installation of the nut 21, the latter can be simply inserted from the upper side through an insertion opening 23 in the laterally protruding section 13 into the receiving opening 19 until it abuts at the lower edge (not shown) of the receiving opening 19, since the latter is open at its upper portion only.

A thread-forming and thus self-locking bolt 25 screwed into each nut 21 forms a first pre-assembled unit together with the nut 21, which can be inserted in the housing 9 and forms a second pre-assembled unit together with the housing 9. This second unit may be furnished to an automobile manufacturer by an automobile supplier fully equipped without there being the need to provide additional fastener means for fitting the unit. For securing the unit, the steering wheel hub 17 comprises several mounting parts 27 moulded thereto. The mounting parts 27 stand off approx. at right angles from the upper side of the steering wheel hub 17 and each feature a free end which is split into two webs 29, 31. The interspace between the webs 29, 31 is slightly wider than the diameter of the bolt 17 in the region of its shank. Each of the webs 29 and 31 features at its free end a nose protruding laterally outwardly. The inner sides of the mounting parts 27 are oriented parallel to each other and parallel to the end sections 15 which is downwardly angled.

For fitting the gas bag module 1, it is simply placed on the steering wheel hub 17 from the upper side, the shanks of the bolts engaging between the webs 29, 31. A spring element 51

(Schematically Shown) is fitted to the lower side of the housing 9. This spring element is supported at the upper side of the steering wheel hub 17 and must be compressed when fitting the module 1. Thereafter, the bolts 25 are tightened. Thereby, the bolt heads grip under the noses of the webs 29, 31 so that the nuts 21 are secured to the mounting part 27 in an interlocking and force-transmitting manner. As a result of this, the nuts 21 form guides for the housing 9 which, when the gas bag module 1 is fitted, is forced upwards into the initial position in which the bolts 25 come into contact with the lower edge of the noses of webs 29, 31.

On actuation of the horn switch, the gas bag module 1 is able to move downwardly in the direction of the steering wheel hub 17 and spring back into position.

The securing means requires few parts, namely only the nut 21 insertable in a receiving opening 19, the bolt 25, and the mounting part 27.

I claim:

1. An attachment device for displaceably securing a gas bag module to a vehicle part, said gas bag module having a housing with at least one receiving opening in said housing, said receiving opening being limited by an edge of said opening, said device comprising said receiving opening, at least one nut which is received in said receiving opening, said nut being fixed to said housing in a manner so as to be non-rotatable but substantially linearly displaceable with respect to said housing by engaging said edge so that a guide for said housing is formed, and comprising at least one bolt screwed into said nut for attaching said nut and, by said nut engaging said edge, attaching said gas bag module to said vehicle part.

2. The attachment device of claim 1, wherein said receiving opening in said housing is elongated.

3. The attachment device of claim 1, wherein said vehicle part is a steering wheel hub.

4. The attachment device of claim 1, wherein said receiving opening is configured as a guide groove.

5. The attachment device of claim 1, wherein said receiving opening is configured as a guide slot.

6. The attachment device of claim 1, wherein a spring element is provided on said gas bag module, said spring element urging said gas bag module into an initial position.

7. The attachment device of claim 1, wherein said nut comprises parallel grooves on opposite sides and wherein said receiving opening has edges which engage into said parallel grooves.

8. The attachment device of claim 1, wherein said housing comprises at least one lateral tab having a laterally protruding section and an adjoining, downwardly angled end section extending parallel to a displacement direction of said gas bag module, said receiving opening being provided at said end section.

9. The attachment device of claim 8, wherein said laterally protruding section of said tab has an insertion opening, said insertion opening extending down to said receiving opening and permitting insertion of said nut into said receiving opening.

10. The attachment device of claim 1, wherein said nut and said bolt screwed into said nut form a first pre-assembled unit, and wherein said first unit together with said gas bag module form a second pre-assembled unit.

11. The attachment device of claim 1, wherein said nut is surrounded by an electrically insulating layer.

12. The attachment device of claim 1, wherein said nut is received in a part rigidly secured to said housing.

13. The attachment device of claim 1, wherein said receiving opening has an open end, via which said nut is inserted into said receiving opening.

14. The attachment device of claim 1, wherein said vehicle part comprises a protruding mounting part split into two webs, said bolt having a shank engaging between said webs when said gas bag module is placed on said vehicle part, said nut being secured to said mounting part.

* * * * *